United States Patent
Eklöf et al.

(10) Patent No.: US 12,432,638 B2
(45) Date of Patent: Sep. 30, 2025

(54) TARGET SECONDARY NODE INITIATED CANCEL OF CONDITIONAL PSCELL CHANGE

(71) Applicant: Telefonaktiebolaget LM Ericsson (publ), Stockholm (SE)

(72) Inventors: Cecilia Eklöf, Täby (SE); Icaro Leonardo Da Silva, Solna (SE); Julien Muller, Rennes (FR)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 361 days.

(21) Appl. No.: 18/030,762

(22) PCT Filed: Oct. 5, 2021

(86) PCT No.: PCT/IB2021/059127
§ 371 (c)(1),
(2) Date: Apr. 6, 2023

(87) PCT Pub. No.: WO2022/074559
PCT Pub. Date: Apr. 14, 2022

(65) Prior Publication Data
US 2023/0370936 A1   Nov. 16, 2023

Related U.S. Application Data

(60) Provisional application No. 63/089,805, filed on Oct. 9, 2020.

(51) Int. Cl.
*H04W 36/36* (2009.01)
*H04W 36/00* (2009.01)

(52) U.S. Cl.
CPC ... *H04W 36/362* (2023.05); *H04W 36/00692* (2023.05); *H04W 36/00698* (2023.05)

(58) Field of Classification Search
None
See application file for complete search history.

(56) References Cited

U.S. PATENT DOCUMENTS

2021/0099926 A1\* 4/2021 Chen ............... H04W 36/362
2021/0258843 A1\* 8/2021 Awada ............. H04W 36/362
(Continued)

OTHER PUBLICATIONS

International Search Report and Written Opinion dated Jan. 20, 2022 issued in International Patent Application No. PCT/IB2021/059127 (16 pages).

(Continued)

*Primary Examiner* — Otis L Thompson, Jr.
(74) *Attorney, Agent, or Firm* — Rothwell, Figg, Ernst & Manbeck, P.C.

(57) ABSTRACT

A method (800) performed by a T-SN for cancelling a conditional PSCell, change (CPC). The method includes the T-SN receiving (s802) a request for a CPC configuration for a UE, wherein the request was transmitted by a first network node (NN), and the UE is connected to the first NN and is also connected to a second NN. The method also includes the T-SM transmitting (s804) to the first NN a response to the request, the response including the CPC configuration for the UE. The method further includes, after transmitting the response, the T-SN transmitting (s806) to the first NN a cancellation indication indicating that the CPC configuration for the UE is cancelled.

23 Claims, 15 Drawing Sheets

(56) References Cited

U.S. PATENT DOCUMENTS

| | | | | |
|---|---|---|---|---|
| 2021/0337449 | A1* | 10/2021 | Zhu | H04W 74/0833 |
| 2021/0352543 | A1* | 11/2021 | Purkayastha | H04W 36/362 |
| 2022/0053397 | A1* | 2/2022 | Huang | H04W 36/08 |
| 2022/0086704 | A1* | 3/2022 | Futaki | H04W 36/36 |
| 2022/0330106 | A1* | 10/2022 | Awada | H04W 36/00698 |
| 2022/0353769 | A1* | 11/2022 | Wang | H04W 36/0058 |
| 2023/0300691 | A1* | 9/2023 | Eklöf | H04W 36/0061 |
| | | | | 370/331 |

OTHER PUBLICATIONS

CATT, "Consideration on SN Initiated Conditional SN Change Procedure", R3-196726, 3GPP TSG-RAN3 Meeting #106, Reno, NV, USA, Nov. 18-22, 2019, XP051823909 (5 pages).

CATT, "Consideration on MN Initiated Conditional SN Change Procedure", R3-196725, 3GPP TSG-RAN3 Meeting #106, Reno, NV, USA, Nov. 18-22, 2019, XP051823908 (4 pages).

ZTE, "TP for BLCR for TS 38.423 Conditional PScell&SCG Cancel in MR-DC@5GC", R3-195121, 3GPP TSG RAN WG3#105bis, Chongqing, China, Oct. 14-18, 2019, XP051792161 (7 pages).

Lenovo et al., "Remaining issues on CPAC", R3-213718, 3GPP TSG-RAN WG3 #113e Online, Aug. 16-27, 2021, XP052035490 (5 pages).

Qualcomm Incorporated, "CPAC replace procedures", R3-213366, 3GPP TSG-RAN WG3 Meeting #113-e E-meeting, Aug. 16-Aug. 26, 2021, XP052035282 (8 pages).

Huawei, "Revised WID on Further Multi-RAT Dual-Connectivity enhancements", RP-201040 (revision of RP-193249), 3GPP TSG RAN Meeting #88e Electronic Meeting, Jun. 29-Jul. 3, 2020 (4 pages).

3GPP TS 38.423 V16.3.0, Sep. 2020, Technical Specification, 3rd Generation Partnership Project; Technical Specification Group Radio Access Network; NG-RAN; Xn application protocol (XnAP) (Release 16) (451 pages).

3GPP TS 38.331 V16.1.0, Jul. 2020, Technical Specification, 3rd Generation Partnership Project; Technical Specification Group Radio Access Network; NR; Radio Resource Control (RRC) protocol specification (Release 16) (905 pages).

3GPP TS 38.300 V16.3.0, Sep. 2020, Technical Specification, 3rd Generation Partnership Project; Technical Specification Group Radio Access Network; NR; NR and NG-RAN Overall Description; Stage 2 (Release 16) (148 pages).

3GPP TS 37.340 V16.3.0, Sep. 2020, Technical Specification, 3rd Generation Partnership Project; Technical Specification Group Radio Access Network; Evolved Universal Terrestrial Radio Access (E-UTRA) and NR; Multi-connectivity; Stage 2 (Release 16) (83 pages).

\* cited by examiner

TARGET SECONDARY NODE INITIATED CANCEL OF CONDITIONAL PSCELL CHANGE

CROSS REFERENCE TO RELATED APPLICATIONS

This application is a 35 U.S.C. § 371 National Stage of International Patent Application No. PCT/IB2021/059127, filed Oct. 5, 2021, which claims priority to U.S. provisional patent application No. 63/089,805, filed on Oct. 9, 2020, which is incorporated by this reference.

TECHNICAL FIELD

This disclosure relates to cancellation of a conditional Primary Secondary-Cell (PSCell) change.

BACKGROUND

Conditional Handover (CHO)

Two new work items for mobility enhancements in LTE and NR have started in 3GPP in release 16. The main objectives of the work items are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

In LTE and NR, different solutions to increase mobility robustness have been discussed in the past. One solution discussed in NR is called "conditional handover" or "early handover command" In order to avoid the undesired dependence on the serving radio link upon the time (and radio conditions) where the UE should execute the handover, the possibility to provide RRC signaling for the handover to the UE earlier should be provided. To achieve this, it should be possible to associate the HO command with a condition for example based on radio conditions possibly similar to the ones associated with an A3 event, where a given neighbour becomes X db better than target. As soon as the condition is fulfilled, the UE executes the handover in accordance with the provided handover command.

Such a condition could, for example, be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold), which is considered optimal for the handover execution.

FIG. 1 depicts a serving and a target cell. In practice there may often be many cells or beams that the UE reported as possible candidates based on its preceding RRM measurements. The network should then have the freedom to issue conditional handover commands for several of those candidates. The RRCConnectionReconfiguration for each of those candidates may differ for example in terms of the HO execution condition (RS to measure and threshold to exceed) as well as in terms of the RA preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

Conditional handover is described in stage 2, TS 38.300 in chapter 9.2.3.4., a portion of which is reproduced below:

TS 38.300 Chapter 9.2.3.4

9.2.3.4 Conditional Handover 9.2.3.4.1 General

A Conditional Handover (CHO) is defined as a handover that is executed by the UE when one or more handover execution conditions are met. The UE starts evaluating the execution condition(s) upon receiving the CHO configuration, and stops evaluating the execution condition(s) once the execution condition(s) is met.

The following principles apply to CHO:
1. The CHO configuration contains the configuration of CHO candidate cell(s) generated by the candidate gNB(s) and execution condition(s) generated by the source gNB.
2. An execution condition may consist of one or two trigger condition(s) (CHO events A3/A5, as defined in [12]). Only a single RS type is supported and at most two different trigger quantities (e.g. RSRP and RSRQ, RSRP and SINR, etc.) can be configured simultaneously for the evalution of CHO execution condition of a single candidate cell.
3. Before any CHO execution condition is satisfied, upon reception of HO command (without CHO configuration), the UE executes the HO procedure as described in clause 9.2.3.2, regardless of any previously received CHO configuration.
4. While executing CHO, i.e., from the time when the UE starts synchronization with target cell, UE does not monitor source cell.

9.2.3.4.2 C-Plane Handling

As in intra-NR RAN handover, in intra-NR RAN CHO, the preparation and execution phase of the conditional handover procedure is performed without involvement of the 5GC; i.e., preparation messages are directly exchanged between gNBs. The release of the resources at the source gNB during the conditional handover completion phase is triggered by the target gNB. FIG. 2 depicts the basic conditional handover scenario where neither the AMF nor the UPF changes.

0/1. Same as step 0, 1 in FIG. 9.2.3.2.1-1 of section 9.2.3.2.1.
2. The source gNB decides to use CHO.
3. The source gNB issues a Handover Request message to one or more candidate gNBs.
4. Same as step 4 in FIG. 9.2.3.2.1-1 of section 9.2.3.2.1.
5. The candidate gNB sends HANDOVER REQUEST ACKNOWLEDGE message including configuration of CHO candidate cell to the source gNB.

6. The source gNB sends an RRCReconfiguration message to the UE, containing the configuration of CHO candidate cell(s) and CHO execution condition(s).
7. UE sends an RRCReconfigurationComplete message to the source gNB.
8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronises to that candidate cell and completes the RRC handover procedure by sending RRCReconfigurationComplete message to the target gNB. The UE releases stored CHO configurations after successful completion of RRC handover procedure.

End TS 38.300 Chapter 9.2.3.4

Cancellation in Conditional Handover

In 3GPP rel-16, the possibility for a candidate target node for conditional handover to cancel one or multiple candidate target cells already prepared for a CHO has been standardized. A new Conditional Handover Cancel procedure was added to 3GPP TS 38.423, a portion of which is reproduced below:

8.2.9.1 General

The Conditional Handover Cancel procedure is used to enable a target NG-RAN node to cancel an already prepared conditional handover. The procedure uses UE-associated signalling.

The target NG-RAN node initiates the procedure by sending the CONDITIONAL HANDOVER CANCEL message to the source NG-RAN node. The target NG-RAN node shall indicate the reason for cancelling the conditional handover by means of an appropriate cause value. At the reception of the CONDITIONAL HANDOVER CANCEL message, the source NG-RAN node shall consider that the target NG-RAN node is about to remove any reference to, and release any resources previously reserved for candidate cells associated to the UE-associated signalling identified by the Source NG-RAN node UE XnAP ID IE and the Target NG-RAN node UE XnAP ID IE. If the Candidate Cells To Be Cancelled List IE is included in CONDITIONAL HANDOVER CANCEL message, the source NG-RAN node shall consider that only the resources reserved for the cells identified by the included NG-RAN CGI are about to be released.

8.2.9.3 Unsuccessful Operation

Not applicable.

8.2.9.4 Abnormal Conditions

If the CONDITIONAL HANDOVER CANCEL message refers to a context that does not exist, the source NG-RAN node shall ignore the message.
If one or more candidate cells in the Candidate Cells To Be Cancelled List IE included in the CONDITIONAL HANDOVER CANCEL message were not prepared using the same UE-associated signaling connection, the source NG-RAN node shall ignore those non-associated candidate cells.

End 3GPP TS 38.423

PSCell Change

The UE can be configured with Dual Connectivity, communicating both via an MCG (Master Cell Group) and an SCG (Secondary Cell Group). When the UE is configured with dual connectivity, the UE is configured with two MAC entities: one MAC entity for the MCG and one MAC entity for the SCG. In Multi-Radio Dual Connectivity (MR-DC) the cell groups are located in two different logical nodes, i.e., different NG-RAN nodes, possibly connected via a non-ideal backhaul, one providing NR access and the other one providing either E-UTRA or NR access. One node acts as the MN (Master Node) and the other as the SN (Secondary Node). The MN and SN are connected via a network interface and at least the MN is connected to the core network.

The operation in MR-DC involves different reconfiguration procedures, like secondary node addition, secondary node modification, secondary node release and secondary node change.

FIG. 3 shows the signalling flow from TS 37.340 for the SN initiated SN change, also called PSCell Change (PC). Therein, the UE is operating in MR-DC i.e., connected to an MN and a S-SN (S-SN) and, S-SN decides to move the UE to a target candidate SN (T-SN), possibly based on reported measurements on S-SN and/or T-SN frequencies. The steps shown in FIG. 3 are described below.
1. The S-SN initiates the SN change procedure by sending SgNB Change Required message which contains T-SN ID information and may include the SCG configuration (to support delta configuration) and measurement results related to the T-SN.
2/3. The MN requests the T-SN to allocate resources for the UE by means of the SgNB Addition procedure, including the measurement results related to the T-SN received from the S-SN. If forwarding is needed, the T-SN provides forwarding addresses to the MN. The T-SN includes the indication of the full or delta RRC configuration.
4/5. The MN triggers the UE to apply the new configuration. The MN indicates the new configuration to the UE in the RRCConnectionReconfiguration message including the NR RRC configuration message generated by the T-SN. The UE applies the new configuration and sends the RRCConnectionReconfigurationComplete message, including the encoded NR RRC response message for the T-SN, if needed. In case the UE is unable to comply with (part of) the configuration included in the RRCConnectionReconfiguration message, it performs the reconfiguration failure procedure.
6. If the allocation of T-SN resources was successful, the MN confirms the release of the S-SN resources. If data forwarding is needed the MN provides data forwarding addresses to the S-SN. If direct data forwarding is used for SN terminated bearers, the MN provides data forwarding addresses as received from the T-SN to S-SN. Reception of the SgNB Change Confirm message triggers the S-SN to stop providing user data to the UE and, if applicable, to start data forwarding.
7. If the RRC connection reconfiguration procedure was successful, the MN informs the T-SN via SgNB Reconfiguration Complete message with the encoded NR RRC response message for the T-SN, if received from the UE.
8. The UE synchronizes to the T-SN.
9. For SN terminated bearers using RLC AM, the S-SN sends the SN Status Transfer, which the MN sends then to the T-SN, if needed.
10. If applicable, data forwarding from the S-SN takes place. It may be initiated as early as the S-SN receives the SgNB Change Confirm message from the MN.
11. The S-SN sends the Secondary RAT Data Usage Report message to the MN and includes the data volumes delivered to and received from the UE over the NR radio for the related E-RABs. The order the S-SN sends the Secondary RAT Data Usage Report message and performs data forwarding with MN/T-SN is not defined. The SgNB may send the report when the transmission of the related bearer is stopped.
12-16. If applicable, a path update is triggered by the MN.
17. Upon reception of the UE Context Release message, the S-SN releases radio and C-plane related resources associated to the UE context. Any ongoing data forwarding may continue.

Conditional PSCell Change (CPC)

A solution for Conditional PSCell Change (CPC) procedure was standardized in Rel-16. Therein a UE operating in Multi-Radio Dual Connectivity (MR-DC) receives in a conditional reconfiguration one or multiple RRC Reconfiguration(s) (e.g., an RRCReconfiguration message) containing an SCG configuration (e.g., an secondaryCellGroup of IE CellGroupConfig) with a reconfigurationWithSync that is stored and associated with an execution condition (e.g., a condition like an A3/A5 event configuration), so that one of the stored messages is only applied upon the fulfilment of the execution condition; for example associated with the serving PSCell, upon which the UE would perform PSCell change (in case it finds a neighbour cell that is better than the current SpCell of the SCG).

The following principles apply to CPC:
1. The CPC configuration contains the configuration of CPC candidate cell(s) and execution condition(s) generated by the SN.
2. An execution condition may consist of one or two trigger conditions (CPC events A3/A5, as defined in RRC specifications). Only single RS type is supported and at most two different trigger quantities (e.g. RSRP and RSRQ, RSRP and SINR, etc.) can be configured simultaneously for the evaluation of CPC execution condition of a single candidate PSCell.
3. Before any CPC execution condition is satisfied, upon reception of PSCell change command or PCell change command, the UE executes the PSCell change procedure or the PCell change procedure, regardless of any previously received CPC configuration. Upon the successful completion of PSCell change procedure or PCell change procedure, the UE releases all stored CPC configurations.
4. While executing CPC, the UE is not required to continue evaluating the execution condition of other candidate PSCell(s).
5. Once the CPC procedure is executed successfully, the UE releases all stored CPC configurations.
6. Upon the release of SCG, the UE releases the stored CPC configurations.

In Rel-16, CPC was limited to intra-node CPC i.e., for a UE configured with MR-DC, the SN determines to configure CPC and provides a CPC configuration to the UE (e.g. via the MN), but the target candidate PSCell is a cell that is also associated to the same SN i.e., both source PSCell and target candidate PSCell(s) are associated to the S-SN. Also, only an SN-initiated CPC with or without MN involvement is supported. FIG. 4 illustrates SN initiated SN Modification without MN involvement.

In this case CPC is configured at the UE by modifying the SCG configuration via SRB3, so the SN initiated modification without MN involved procedure is used, as shown above. The SN can decide whether the Random Access procedure is required. Some of the steps shown in FIG. 4 are described below.
1. The SN sends the RRCReconfiguration message to the UE through SRB3. The UE applies the new configuration. For CPC that contains the IE ConditionalReconfiguration, which is part of the SCG Configuration and includes an RRCReconfiguration to be stored, per target candidate PSCell, and a condition configuration (on or two measId(s) pointing to a measurement configuration).
3a. In case of CPC, the UE maintains connection with source PSCell after receiving CPC configuration, and starts evaluating the CPC execution conditions for candidate PSCell(s). If at least one CPC candidate PSCell satisfies the corresponding CPC execution condition, the UE detaches from the source PSCell, applies the stored corresponding configuration for the selected candidate PSCell and synchronises to that candidate PSCell.

The UE completes the CPC execution procedure by sending an RRCReconfigurationComplete message to the new PSCell if the SRB3 is configured.

FIG. 5 illustrates transfer of an NR RRC message to/from the UE (when SRB3 is not used).

This procedure is used in case SRB3 is not configured. The SN initiates the procedure when it needs to transfer an NR RRC message to the UE and SRB3 is not used; and, in this particular case, the configuration contains an NR SCG RRCReconfiguration including the IE ConditionalReconfiguration, which is part of the SCG Configuration and includes an RRCReconfiguration to be stored, per target candidate PSCell, and a condition configuration (on or two measId(s) pointing to a measurement configuration). The steps shown in FIG. 5 are described below.
1. The SN initiates the procedure by sending the SgNB Modification Required to the MN.
2. The MN forwards the NR RRC message to the UE in the RRCConnectionReconfiguration message.
3. The UE applies the new configuration and replies with the RRCConnectionReconfigurationComplete message.
3a. If CPC is configured in the RRCConnectionReconfiguration, the UE maintains the connection with source PSCell after receiving the CPC configuration, and starts evaluating the CPC execution conditions for candidate PSCell(s). If at least one CPC candidate PSCell satisfies the corresponding CPC execution condition, the UE detaches from the source PSCell, applies the stored corresponding configuration for the selected candidate PSCell and synchronises to that candidate PSCell. The UE completes the CPC execution procedure by sending an ULInformationTransferMRDC message to the MN which includes an embedded RRCReconfiguration-Complete message to the new PSCell.

4. The MN forwards the NR RRC response message, if received from the UE, to the SN in the SgNB Modification Confirm message.
5. If instructed, the UE performs synchronisation towards the PSCell of the SN as described in SgNB Addition procedure. Otherwise the UE may perform UL transmission after having applied the new configuration.

In rel-16 CPC will be supported, but in rel-17 also PSCell Addition will be included, i.e., Conditional PSCell Addition/Change (CPAC). In rel-16 only intra-SN CPC without MN involvement is standardized. Inter SN PSCell CPC and CPC with MN involvement will be included in rel-17.

As described above, in rel-16 only intra-SN case without MN involvement for CPC is supported, i.e., where S-SN and T-SN are the same node in picture 10.5.1-2 from TS 37.340. That means that the cell is changed, but both the old and the new cell are in the same node.

SUMMARY

A problem that the disclosure addresses relates to a new scenario to be supported in Rel-17, which is when a UE is operating in Multi-Radio Dual Connectivity (MR-DC), i.e., having a connection with a Master Node (MN) and a Secondary Node (SN), and the UE is configured with an inter-SN, SN initiated Conditional PSCell Change (CPC), i.e., when at least one target candidate PSCell in CPC is associated with a target candidate SN (T-SN) that is not the same node as the source SN (S-SN) to which the UE is connected. In existing solutions, there is no possibility for the T-SN or the S-SN to cancel one or multiple candidate PSCells. In the existing standard, there is no signalling and associated procedures supporting inter-SN, MN initiated Conditional PSCell Change (CPC).

Accordingly, certain challenges presently exist. That is, for example, a problem of existing solutions is that in CPC, the MN requests the T-SN to configure CPC, e.g., to resource resources for CPC and to prepare an RRC reconfiguration including an SCG configuration (with reconfiguration with sync) to be applied upon fulfilment of an execution condition. Then, when the T-SN prepares that message the T-SN needs to reserve a certain amount of resources such as C-RNTI, RACH (in case of contention free RACH is configured), transmission power, bandwidth, and make sure the services/bearers the UE is running are supported in target with a minimum QoS, etc. A problem that exists is that time-wise, the T-SN does not really know when the UE is fulfilling the condition that will trigger the SN change. In addition to that, it is not even certain that the UE is going to a specific T-SN, as CPC may support the configuration of multiple target candidate PSCells possibly from multiple T-SNs. And, as the load and overall conditions in a mobile network is quite volatile, the load and overall conditions may be very different at the time a given node that is a potential T-SN for CPC accepts a request from an MN, and the time the UE performs the access.

In current procedures related to conventional SN change (like in a legacy SN Addition procedure), there is no possibility for the candidate T-SN to cancel one or multiple already prepared candidate PSCells in order to free resources for incoming UEs and to react to the actual load of its cells.

Certain aspects of the present disclosure and their embodiments may provide solutions to these or other challenges.

Accordingly, in one aspect there is provided a method performed by a T-SN for cancelling a conditional PSCell, change (CPC). The method includes the T-SN receiving a request for a CPC configuration for a UE, wherein the request was transmitted by a first network node (NN), and the UE is connected to the first NN and is also connected to a second NN. The method also includes the T-SM transmitting to the first NN a response to the request, the response including the CPC configuration for the UE. The method further includes, after transmitting the response, the T-SN transmitting to the first NN a cancellation indication indicating that the CPC configuration for the UE is cancelled.

In another aspect there is provided a method performed by an MN for cancelling a CPC. The method includes the MN receiving a cancellation indication transmitted by a T-SN indicating that a CPC configuration previously provided to a user equipment, UE, is cancelled. The method further includes, after receiving the cancellation indication, the MN reconfiguring the UE.

In another aspect there is provided a method performed by an S-SN for cancelling a CPC. The method includes the S-SN receiving from an MN an message indicating cancellation of at least a first candidate PSCell. The method further includes the S-SN sending to the MN a response message responsive to the indication message.

In another aspect there is provided a computer program comprising instructions which when executed by processing circuitry of a network node causes the network node to perform any of the methods disclosed herein. In one embodiment, there is provided a carrier containing the computer program wherein the carrier is one of an electronic signal, an optical signal, a radio signal, and a computer readable storage medium.

In another aspect there is provided a network node that is configured to perform the methods disclosed herein. The network node may include memory and processing circuitry coupled to the memory.

The various embodiments described herein address one or more of the issues disclosed herein. The embodiments may provide one or more of the following technical advantage(s). Certain embodiments make it possible for a T-SN to cancel an already prepared CPC. In case of a change in available resources in one or multiple candidate cells belonging to the T-SN, one or multiple cells (or all) can free resources for non-conditional HO or SN addition.

DETAILED DESCRIPTION

Figure 1:
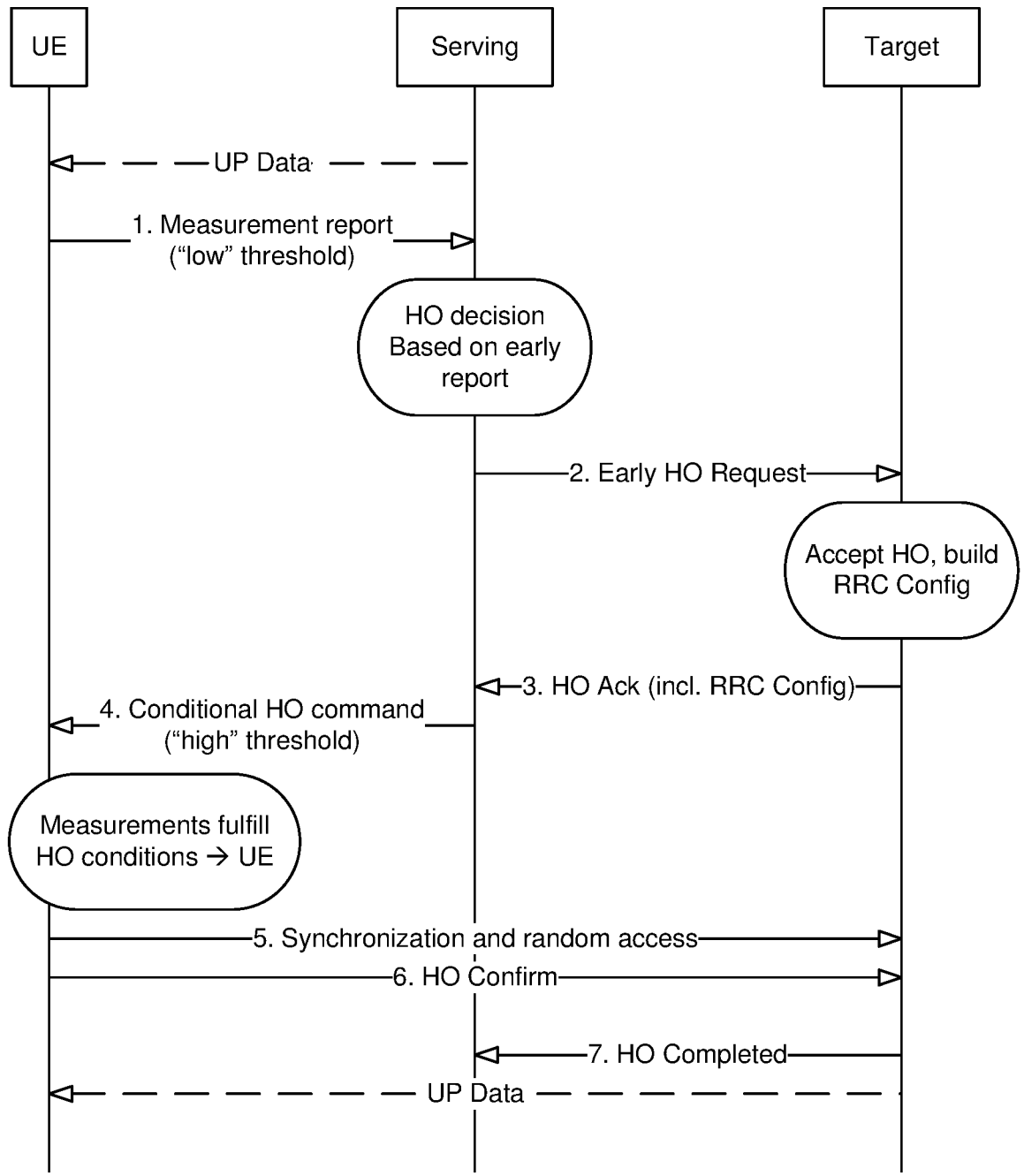
FIG. 1 depicts a serving and a target cell.
Figure 2:
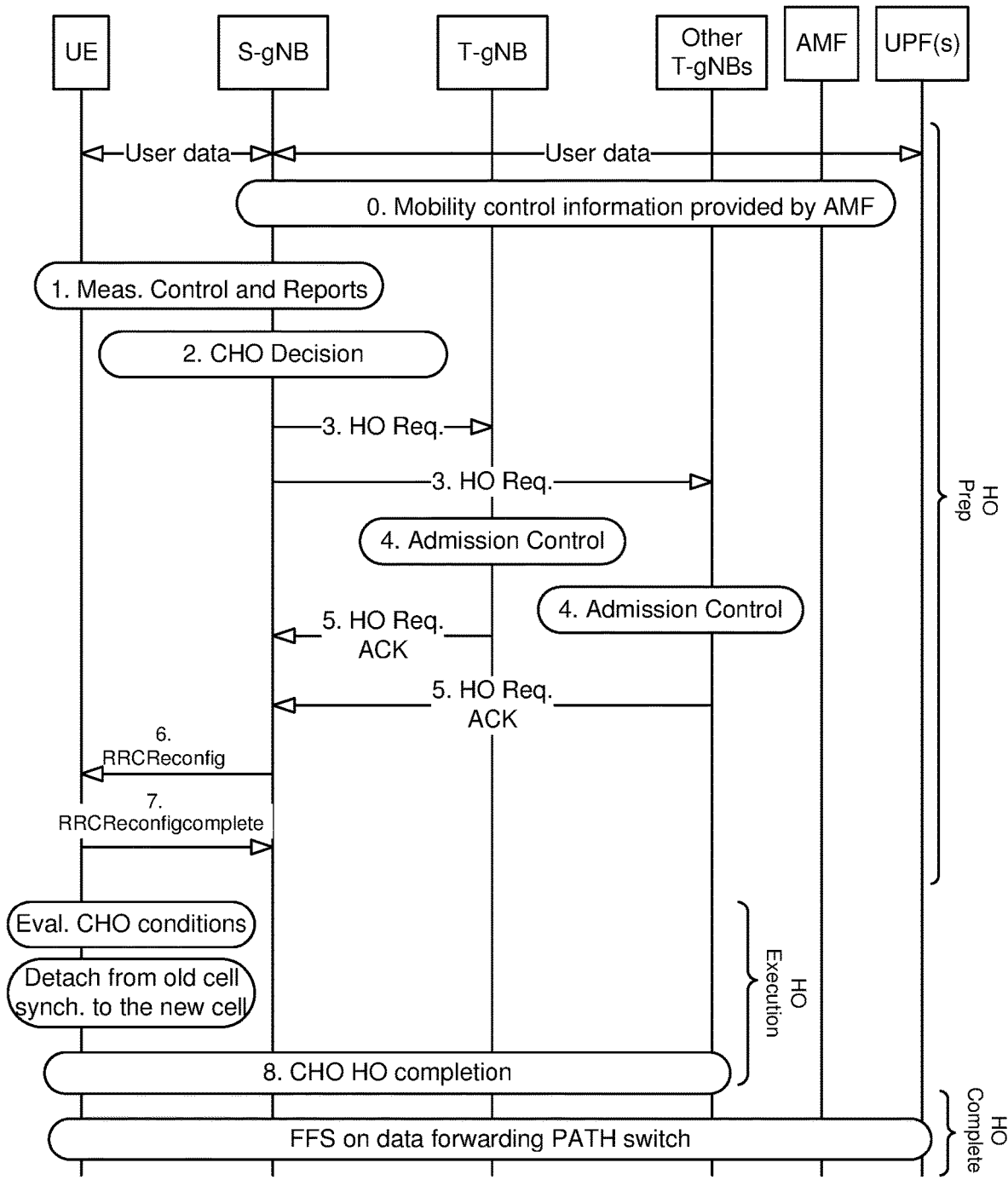
FIGS. 2-5 are a message flow diagrams.
Figure 3:
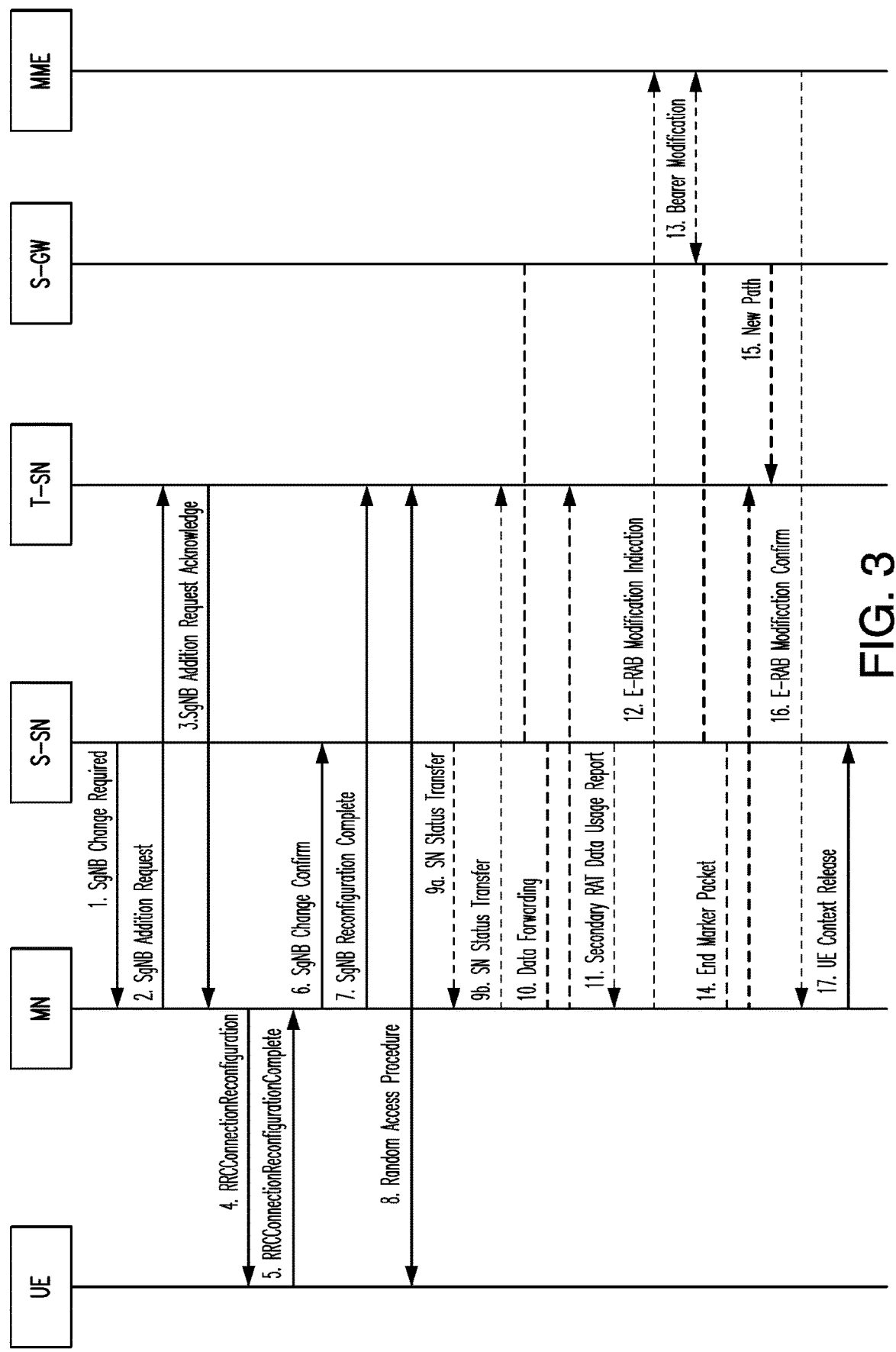
Figure 4:
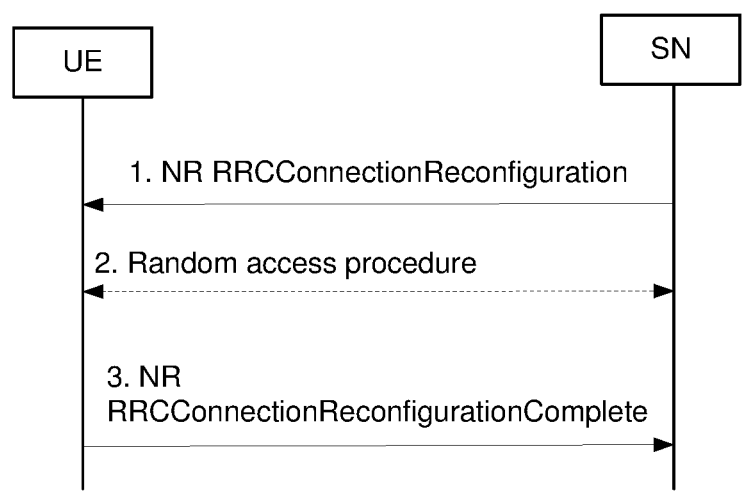
Figure 5:
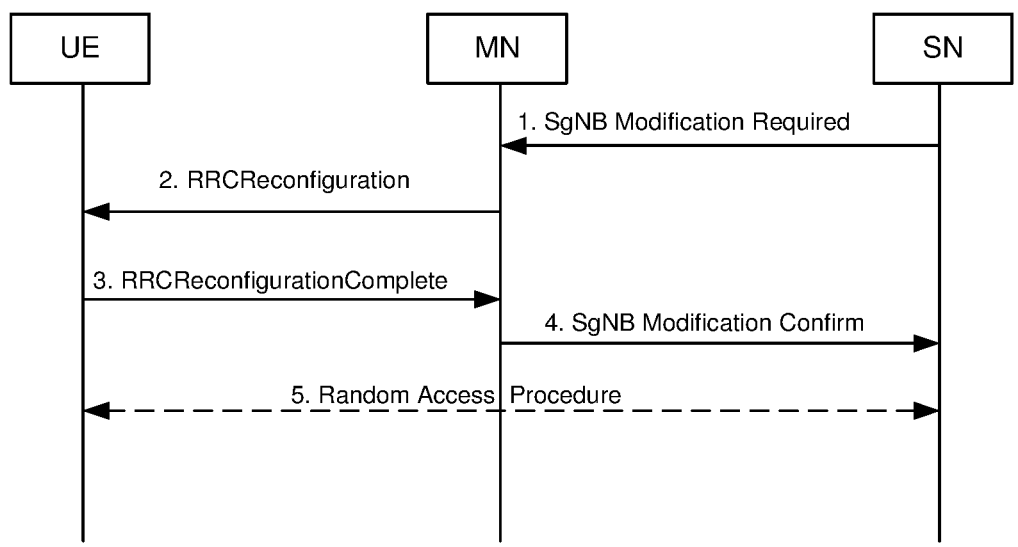

This disclosure describes the cancellation of one or multiple candidate cells (sometimes called target candidate cells) belonging to (or associated with) a target candidate SN (T-SN), after a successful SN Addition preparation The disclosure refers to a UE operating in Multi-Radio Dual Connectivity (MR-DC) according to the NR specifications e.g., TS 37.340, TS 38.331, etc. The disclosure refers to a first network node (NN) operating as a Master Node (MN), e.g., having a Master Cell Group (MCG) configured to the UE and/or an MN-terminated bearer; that MN can be a gNodeB, or a Central Unit gNodeB (CU-gNB) or an eNodeB, or a Central Unit eNodeB (CU-gNB), or any network node. The disclosure also refers to a second network node operating as a Secondary Node (SN), or Source Secondary Node (S-SN) e.g. having a Secondary Cell Group (SCG) configured to the UE and/or an SN-terminated bearer; that SN can be a gNodeB, or a Central Unit gNodeB (CU-gNB) or an eNodeB, or a Central Unit eNodeB (CU-gNB), or any network node. Notice that MN, S-SN and T-SN may be from the same or different Radio Access Technologies (and possibly be associated to different Core Network nodes).

The disclosure refers to a target candidate SN (or, for short, target SN (T-SN)) as the network node (e.g. gNodeB) that is prepared during the CPC procedure and that creates an RRC Reconfiguration message with an SCG configuration to be provided to the UE and stored, with an execution condition, wherein the UE only applies the message upon the fulfilment of the execution condition. That T-SN is associated to one or multiple target candidate cell(s) that the UE can be configured with. The UE then can execute the condition and accesses one of these target candidate cells, associated with a T-SN that becomes the T-SN after execution (i.e., upon fulfilment of the execution condition).

The disclosure refers to a Conditional PSCell Change (CPC) and/or Conditional PSCell Addition (CPA) and/or Conditional PSCell Change/Addition (CPAC) configuration and procedures (like CPAC execution). Other terms may be considered as synonyms such as conditional reconfiguration, or Conditional Configuration (since the message that is stored and applied upon fulfilment of a condition is an RRCReconfiguration or RRCConnectionReconfiguration). Terminology wise, one could also interpret conditional handover (CHO) in a broader sense, also covering CPC (Conditional PSCell Change) or CPAC (Conditional PSCell Addition/Change) procedures.

The configuration of CPC can be done using the same IEs as conditional handover, which may be called at some point conditional configuration or conditional reconfiguration. The principle for the configuration is the same with configuring triggering/execution conditions and a reconfiguration message to be applied when the triggering conditions are fulfilled. The configuration IEs from TS 38.331 are shown and described below:

The ConditionalReconfiguration IE, shown in table below, is used to add, modify and release the configuration of conditional configuration.

```
ConditionalReconfiguration-r16 ::=    SEQUENCE {
attemptCcondReconfig-r16              ENUMERATED {true}         OPTIONAL,
-- Need N
condConfigToRemoveList-r16            CondConfigToRemoveList-r16   OPTIONAL, --
Need N
condConfigToAddModList-r16            CondConfigToAddModList-r16   OPTIONAL, -
- Need N
...
}
CondConfigToRemoveList-r16 ::=    SEQUENCE (SIZE (1.. maxNrofCondCells))
OF CondConfigId-r16
ConditionalReconfiguration field descriptions:
condConfigToAddModList: List of the configuration of candidate SpCells to be added or
modified for CHO or CPC.
condConfigToRemoveList: List of the configuration of candidate SpCells to be removed.
When the network removes the stored conditional configuration for a candidate cell, the
network releases the measIDs associated to the condExecutionCond if it is not used by the
condExecutionCond of other candidate cells.
```

The CondConfigId IE, which is shown in the table below, is used to identify a CHO or CPC configuration.

```
CondConfigId-r16 ::=    INTEGER (1.. maxNrofCond-Cells)
```

The CondConfigToAddModList IE, which is shown in the table below, concerns a list of conditional configurations to add or modify, with for each entry the cho-ConfigId and the associated condExecutionCond and condRRCReconfig.

```
CondConfigToAddModList-r16 ::=         SEQUENCE (SIZE (1..
maxNrofCondCells)) OF CondConfigToAddMod-r16
CondConfigToAddMod-r16 ::=             SEQUENCE {
```

```
condConfigId-r16              CondConfigId-r16,
condExecutionCond-r16           SEQUENCE (SIZE (1..2)) OF MeasId
OPTIONAL, -- Need S
condRRCReconfig-r16            OCTET STRING (CONTAINING
RRCReconfiguration) OPTIONAL,   -- Need S
...
}
```
FIELD DESCRIPTIONS:
condExecutionCond: The execution condition that needs to be fulfilled in order to trigger the execution of a conditional configuration. The field is mandatory present when a condConfigId is being added. Otherwise, when the condRRCReconfig associated to a condConfigId is being modified it is optionally present and the UE uses the stored value if the field is absent.
condRRCReconfig: The RRCReconfiguration message to be applied when the condition(s) are fulfilled. The field is mandatory present when a condConfigId is being added. Otherwise, when the condExecutionCond associated to a condConfigId is being modified it is optionally present and the UE uses the stored value if the field is absent.

The disclosure provides embodiments for two different assumptions: (1) SN initiated CPC and (2) MN initiated CPC. In MN initiated or SN initiated CPC, the CPC configuration could be generated by the SN or by the MN. In the case the CPC configuration is generated by the SN, it would also be the SN that generates the RRC Reconfiguration message (in this case an SCG RRCReconfiguration) to release (e.g., remove) the CPC configuration at the UE when CPC is being cancelled. In the case the CPC configuration is generated by the MN, it would also be the MN that generates the RRC Reconfiguration message to release (e.g., remove) the CPC configuration at the UE when CPC is being cancelled.

Target SN candidate (T-SN) Initiated cancelling of SN initiated CPC

Figure 6:
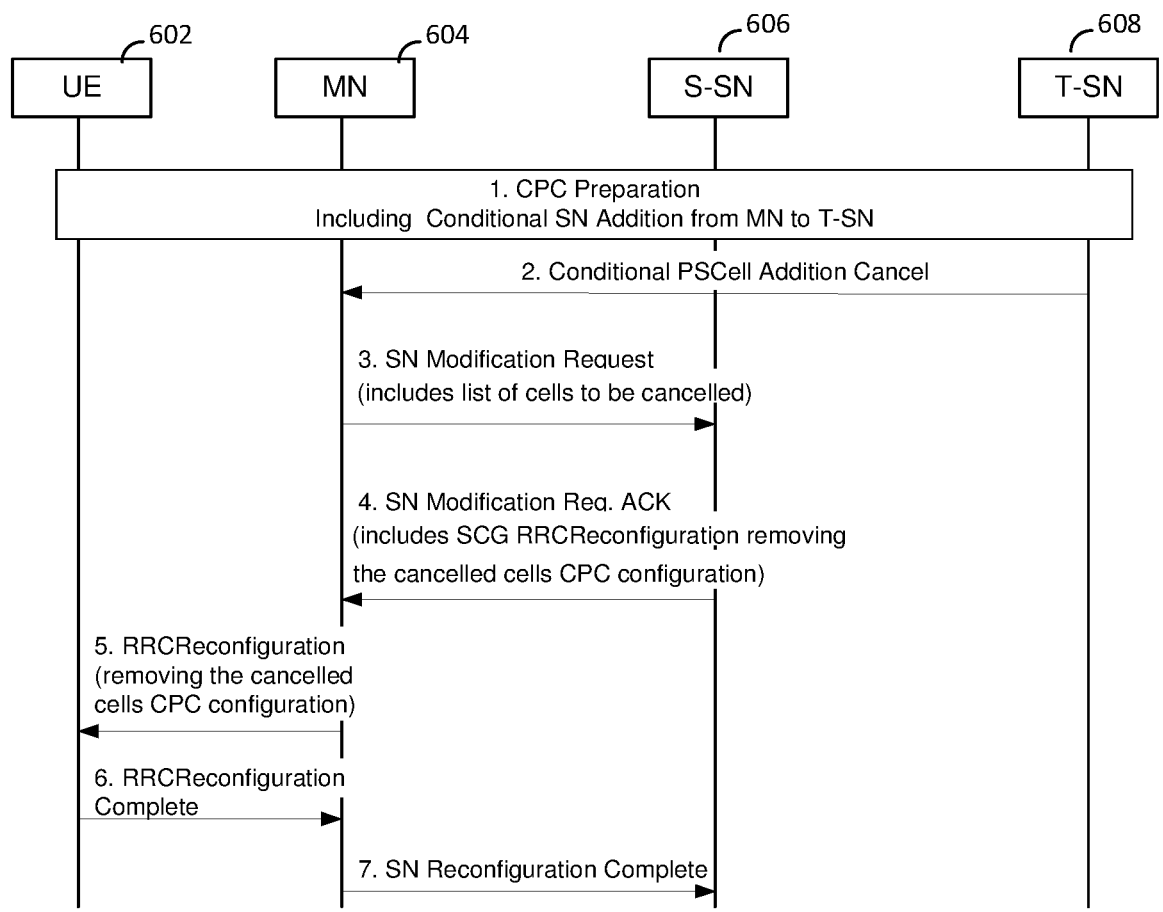
FIG. 6 is a message flow diagram illustrating an embodiment.

In this option, illustrated in FIG. 6, a source SN (S-SN) 606 initiates the configuration of conditional PSCell Change (CPC) and the final message sent to the UE 602 with the conditional reconfiguration is built in the S-SN. The message can be sent directly to the UE in case SRB3 is configured, otherwise the message is transferred to an MN 604, which forwards the message to the UE. The steps shown in FIG. 6 are described below.

Step 1 includes the configuration of CPC with the S-SN building the reconfiguration message towards the UE where CPC is configured. The configuration may be done in several different ways using different messages and/or different signalling flow.

Step 2: A T-SN 608 sends a cancelling indication to the MN indicating that the conditional SN addition configuration provided in step 1 is cancelled (for example, because resources provided in step 1 need to be freed for other UEs). Upon sending this cancelling indication, the T-SN performs actions such as, for example, releasing of resources associated to the CPC configuration that has been indicated to be cancelled, stops supervision timer, etc.

Step 3: The MN transmits to the S-SN a request to cancel one or multiple candidate PSCells from the CPC configuration established in step 1. In other words, this message is like an indication to the S-SN to cancel CPC (i.e., an indication to trigger the S-SN to generate an SCG RRC Reconfiguration that releases (e.g., removes) at least one target cell candidate for CPC that has been indicated by the T-SN that is a target candidate cell to be cancelled). In one embodiment, the request is a S-NODE MODIFICATION REQUEST message containing a list of candidates PSCells to be cancelled. Step 3 is relevant for an SN-generated CPC (i.e., the RRC reconfiguration for the removal of CPC target cell candidates, upon CPC cancelled triggered by the T-SN, is an SCG RRC Reconfiguration also generated by the SN). In the case this was an MN-generated CPC, the ConditionalReconfiguration removing target candidate CPC cell(s) is also generated by the MN, i.e., the MN does not need to request the S-SN to generate the SCG RRC Reconfiguration to release CPC target candidates. On the other hand, the MN may indicate to the S-SN that CPC is being cancelled for one or multiple target candidate cells.

An example implementation in TS 38.423 is given below:
Example Implementation in TS 38.423:

9.1.2.5 S-Node Modification Request

This message is sent by the M-NG-RAN node to the S-NG-RAN node to either request the preparation to modify S-NG-RAN node resources for a specific UE, or to query for the current SCG configuration, or to provide the S-RLF-related information to the S-NG-RAN node.

Direction: M-NG-RAN node→S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |

| IE/Group Name | Presence | Range | IE type and reference | Semantics description |
|---|---|---|---|---|
| S-NG-RAN node UE XnAP ID | M | | NG-RAN node UE XnAP ID 9.2.3.16 | Allocated at the S-NG-RAN node |
| Cause | M | | 9.2.3.2 | |
| [. . .] | | | | |
| SN triggered | O | | ENUMERATED (TRUE . . .) | |
| PSCells Candidates To Be Cancelled List | | 0 . . . 1 | | Used to cancel an already prepared Conditional PSCell Change. Contains the list of PSCells Candidates to be cancelled |
| >PSCells Candidates To Be Cancelled Item | | 1 . . . <maxnoofPSCellsCandidates> | | |
| >>PSCell candidate ID | M | | Global NG-RAN Cell Identity 9.2.2.27 | |

| Range bound | Explanation |
|---|---|
| maxnoofPDUSessions | Maximum no. of PDU sessions. Value is 256 |
| maxnoofPSCellsCandidates | Maximum no. of PSCells candidates for Conditional PSCell Change |

In another embodiment, the list of PSCells candidates to be cancelled is contained in the inter-node RRC message (i.e., M-NG-RAN node to S-NG-RAN node Container IE) of the S-NODE MODIFICATION REQUEST message. In another embodiment, the request is a new XnAP message containing the list of PSCells candidates to be cancelled (in a separate IE or in an RRC container). In another embodiment, the conditional reconfiguration ID is sent instead of the target candidate cells IDs.

In one option, the list of cells to be cancelled for CPC may be an indication that the message is a request for the S-SN to generate a CPC configuration (to be provided to the UE) removing the indicated target candidate cells, so that when the UE receives the message, the UE releases the CPC target candidate cells that are cancelled according to the T-SN cancel indication (in step 2).

Step 4: Upon receiving the request in step 3 and determining that this is a request for CPC cancel, the S-SN determines which target candidate cells for a given UE configured with CPC are to be released. Then, the S-SN generates an SCG reconfiguration message for that UE including a CPC configuration including an indication indicating to the UE that at least one target candidate cell is to be released. Then, the S-SN transmits the new SCG RRCReconfiguration to the MN, for deleting the configuration for one or multiple conditional PSCells candidates. In one embodiment, the RRCReconfiguration message is contained in a S-NODE MODIFICATION REQUEST ACKNOWLEDGE message.

Step 4 is relevant for an SN-generated CPC (i.e., the RRC reconfiguration for the removal of CPC target cell candidates, upon CPC cancelled triggered by the T-SN, is an SCG RRC Reconfiguration also generated by the SN). In the case this was an MN-generated CPC, the ConditionalReconfiguration removing target candidate CPC cell(s) is also generated by the MN, i.e., MN does not need to request the S-SN to generate the SCG RRC Reconfiguration to release CPC target candidates. On the other hand, the S-SN may receive an indication from the MN that CPC is being cancelled for one or multiple target candidate cells.

An example of such implementation in TS 38.423 is given below:

Example Implementation in TS 38.423:

9.1.2.6 S-Node Modification Request Acknowledge

This message is sent by the S-NG-RAN node to confirm the M-NG-RAN node's request to modify the S-NG-RAN node resources for a specific UE.

Direction: S-NG-RAN node→M-NG-RAN node.

| IE/Group Name | Presence | IE type and reference | Semantics description |
|---|---|---|---|
| Message Type | M | 9.2.3.1 | |
| M-NG-RAN node UE XnAP ID | M | NG-RAN node UE XnAP ID 9.2.3.16 | Allocated at the M-NG-RAN node |
| S-NG-RAN node UE XnAP ID | M | NG-RAN node UE XnAP ID 9.2.3.16 | Allocated at the S-NG-RAN node |

| IE/Group Name | Presence | IE type and reference | Semantics description |
|---|---|---|---|
| [. . .] | O | PDU session List 9.2.1.27 | |
| S-NG-RAN node to M-NG-RAN node CPC Container | O | OCTET STRING | Includes the CG-Config message as defined in subclause 11.2.2 of TS 38.331 [10]. |

| Range bound | Explanation |
|---|---|
| maxnoofPDUSessions | Maximum no. of PDU sessions. Value is 256 |

Alternatively, the RRCReconfiguration is contained in a new XnAP message.

- Step 5: The MN sends to the UE an RRCReconfiguration message containing the new UE configuration where the previously configured CPC cells have been released from the configuration.
- Step 6: The UE completes the reconfiguration and informs the MN in an RRCReconfigurationComplete message.
- Step 7: The MN informs the S-SN that the UE has been successfully reconfigured with an SN Reconfiguration message.

Figure 7:
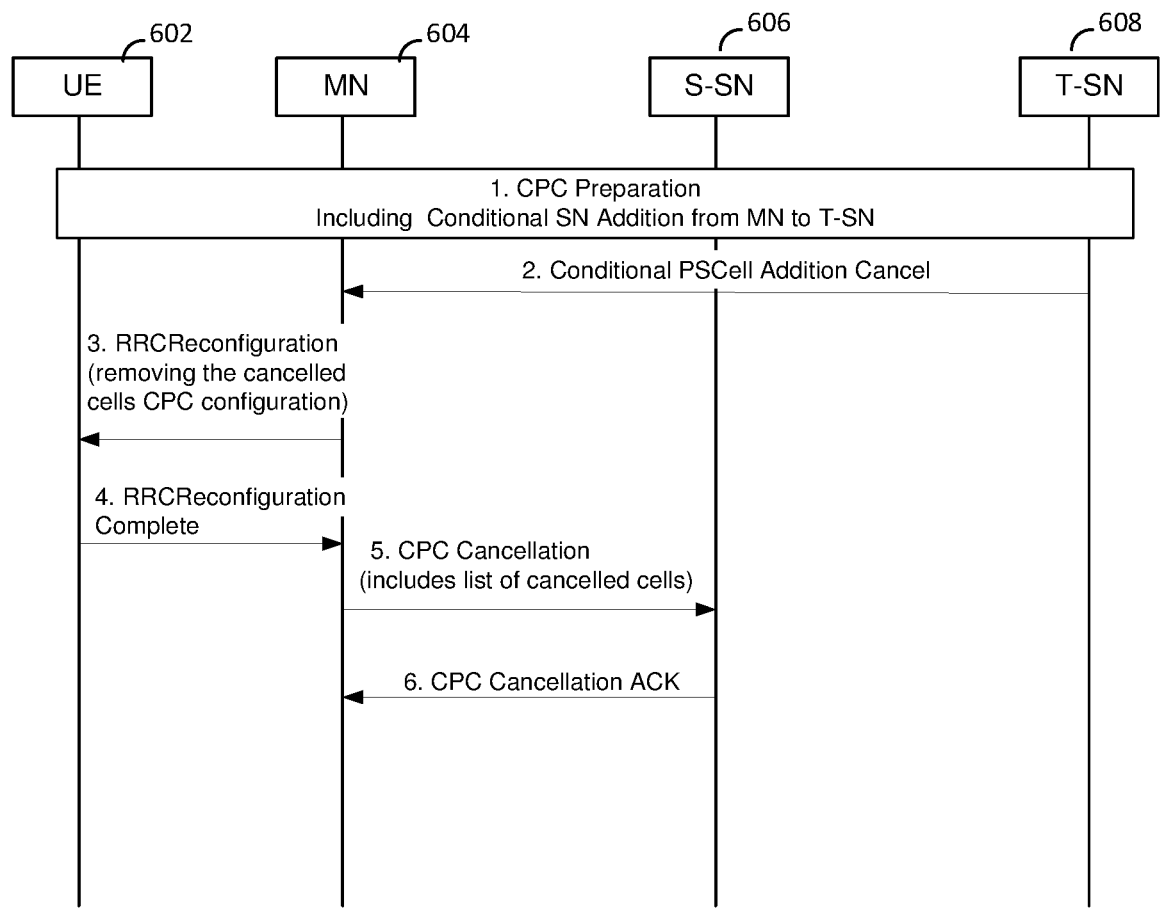
FIG. 7 is a message flow diagram illustrating an embodiment.

T-SN initiated cancelling of CPC of MN-initiated CPC:

In this option, which is illustrated in FIG. 7, the MN 604 initiates the configuration of conditional PSCell Change (CPC) and the final message sent to the UE 602 with the conditional reconfiguration is created by the MN 604. The steps shown in FIG. 7 are described below.

- Step 1 includes the configuration of CPC with the MN 604 generating the reconfiguration message towards the UE 602 where CPC is configured. The configuration may be done in many different ways using different messages and/or different signalling flow.
- Step 2: The T-SN 608 sends a cancelling indication to the MN indicating that the conditional SN addition configuration provided in step 1 is cancelled (for example, because the resources provided in step 1 needs to be freed for other UEs). Upon sending this cancelling indication, the T-SN performs actions such as, for example, releasing of resources associated to the CPA that has been indicated to be cancelled, stops supervision timer, etc.
- Step 3: The MN prepares a new RRCReconfiguration by removing the PSCells candidates which have been indicated by the T-SN in step 2. The MN sends the new RRCReconfiguration message to the UE. Step 3 is relevant for an MN-generated CPC (i.e., the RRC reconfiguration for the removal of CPC target cell candidates, upon CPC cancelled triggered by the T-SN, is an RRC Reconfiguration generated by the MN). In the case this was an SN-generated CPC, the ConditionalReconfiguration removing target candidate CPC cell(s) is generated by the S-SN (i.e., MN would need to request the S-SN to generate the SCG RRC Reconfiguration to release CPC target candidates).
- Step 4: The UE completes the reconfiguration and informs the MN in an RRCReconfigurationComplete message.
- Step 5 (optional): The MN sends a message to the S-SN including a list of PSCells candidates that have been cancelled by the T-SN and released from the UE CPC configuration. In step 6, the S-SN responds with an acknowledgment.
- Step 5 is relevant for an MN-generated CPC (i.e., the RRC reconfiguration for the removal of CPC target cell candidates, upon CPC cancelled triggered by the T-SN, is an RRC Reconfiguration generated by the MN). In the case this was an SN-generated CPC, the ConditionalReconfiguration removing target candidate CPC cell(s) is generated by the S-SN (i.e., MN would need to request the S-SN to generate the SCG RRC Reconfiguration to release CPC target candidates (hence the SN would know which cells are to be cancelled)).

An example of such XnAP message is given below:

Example XnAP Message 9.1.2.x Conditional PSCells Change Cancellation

This message is sent by the M-NG-RAN node to the S-NG-RAN node to indicate that some of the PSCells candidates have been released from the Conditional PSCells Change configuration.

Direction: M-NG-RAN node S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |

| IE/Group Name | Presence | Range | IE type and reference | Semantics description |
|---|---|---|---|---|
| S-NG-RAN node UE XnAP ID | M | | NG-RAN node UE XnAP ID 9.2.3.16 | Allocated at the S-NG-RAN node |
| PSCells Candidates Cancelled List | | 1 | | For an already prepared Conditional PSCell Change, this IE contains the list of cancelled PSCells Candidates |
| >PSCells Candidates Cancelled Item | | 1 ... <maxnoofPSCellsCandidates> | | |
| >>PSCell candidate ID | M | | Global NG-RAN Cell Identity 9.2.2.27 | |

| Range bound | Explanation |
|---|---|
| maxnoofPSCellsCandidates | Maximum no. of PSCells candidates for Conditional PSCell Change |

In another embodiment, the list of cancelled PSCells candidates can be contained in a XnAP S-NODE MODIFICATION REQUEST message. In another embodiment, the conditional reconfiguration ID is sent instead of the target candidate cells IDs. An example of such implementation in TS 38.423 is given below:

Example Implementation in TS 38.423

9.1.2.5 S-Node Modification Request

This message is sent by the M-NG-RAN node to the S-NG-RAN node to either request the preparation to modify S-NG-RAN node resources for a specific UE, or to query for the current SCG configuration, or to provide the S-RLF-related information to the S-NG-RAN node.

Direction: M-NG-RAN node→S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| S-NG-RAN node UE XnAP ID | M | | NG-RAN node UE XnAP ID 9.2.3.16 | Allocated at the S-NG-RAN node |
| Cause | M | | 9.2.3.2 | |
| SN triggered | O | | ENUMERATED (TRUE ...) | |
| PSCells Candidates Cancelled List | | 0 ... 1 | | For an already prepared Conditional PSCell Change, this IE contains the list of cancelled PSCells Candidates |
| >PSCells Candidates Cancelled Item | | 1 ... <maxnoofPSCellsCandidates> | | |
| >>PSCell candidate ID | M | | Global NG-RAN Cell Identity 9.2.2.27 | |

| Range bound | Explanation |
| --- | --- |
| maxnoofPDUSessions | Maximum no. of PDU sessions. Value is 256 |
| maxnoofPSCellsCandidates | Maximum no. of PSCells candidates for Conditional PSCell Change |

Figure 8:
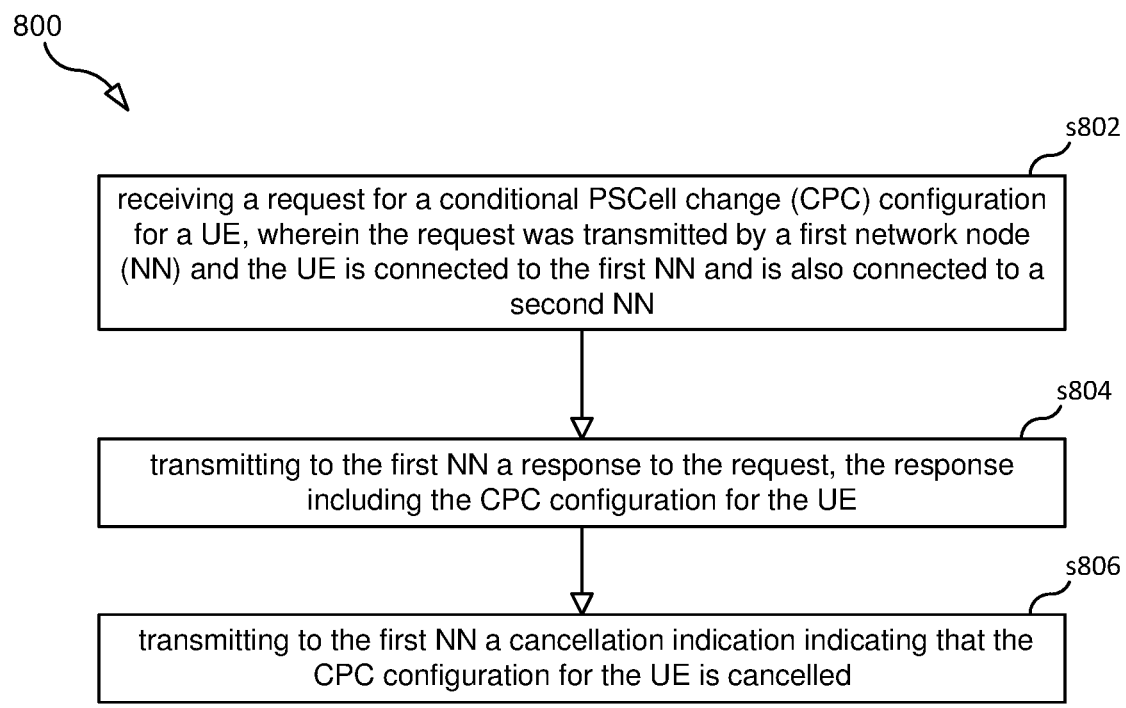
FIG. 8 is a flowchart illustrating a process according to an embodiment.

FIG. 8 is a flowchart illustrating a process 800, according to an embodiment, that is performed by T-SN 608 for cancelling a CPC. Process 800 may begin in step s802.

Step s802 comprises T-SN 608 receiving a request for a CPC configuration for UE 602, wherein the request was transmitted by a first network node (NN) (e.g., either MN 604 or S-SN 606) and the UE is connected to the first NN and is also connected to a second NN.

Step s804 comprises T-SN 608 transmitting to the first NN a response to the request, the response including the CPC configuration for the UE.

Step s806 comprises T-SN 608, after transmitting the response, transmitting to the first NN a cancellation indication indicating that the CPC configuration for the UE is cancelled.

In some embodiments, process 800 further includes T-SN 608, after receiving the request, allocating resources for the UE.

In some embodiments, the first NN is MN 604 and the second NN is S-SN 606. In other embodiments, the second NN is MN 604 and the first NN is S-SN 606.

In some embodiments, process 800 further includes T-SN 608, after determining to send the cancelling indication, performing at least one of: releasing resources that were allocated to the UE in response to receiving the request, or stopping supervision of a timer.

In some embodiments, the CPC configuration comprises an RRCReconfiguration message. In some embodiments, the RRCReconfiguration message is for a target candidate cell.

Figure 9:
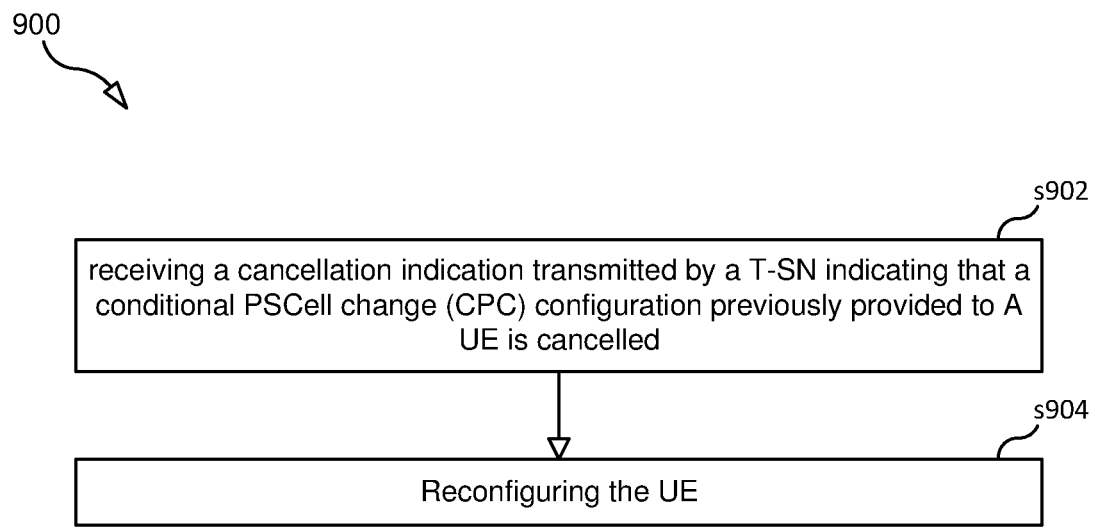
FIG. 9 is a flowchart illustrating a process according to an embodiment.

FIG. 9 is a flowchart illustrating a process 900, according to an embodiment, that is performed by MN 604 for cancelling a CPC. Process 900 may begin in step s902. Step s902 comprises MN 604 receiving a cancellation indication transmitted by a target secondary node, T-SN, indicating that a conditional PSCell change, CPC, configuration previously provided to a user equipment, UE, is cancelled. Step s904 comprises MN 604, after receiving the cancellation indication, reconfiguring the UE.

In some embodiments, reconfiguring the UE comprises causing the UE to release the CPC configuration.

In some embodiments, the cancellation indication comprises information identifying one or more candidate PSCells served by the T-SN, and reconfiguring the UE comprises causing the UE to release the identified candidate PSCells cells from the CPC configuration.

In some embodiments, process 900 also includes MN 604, after reconfiguring the UE, sending a confirmation to S-SN 606 that the UE has been successfully reconfigured.

In some embodiments, process 900 also includes MN 604, after receiving the cancellation indication, transmitting to S-SN 606 a message for indicating the cancellation. In some embodiments, the message for indicating the cancellation includes a list of cells to be cancelled.

In some embodiments, process 900 also includes MN 604 receiving a new Secondary Cell Group (SCG) RRCReconfiguration transmitted by the S-SN. In some embodiments, the new SCG RRCReconfiguration includes a list of candidate PSCells to be released from the CPC configuration.

In some embodiments, process 900 also includes MN 604 taking into account cancelation of one or more candidate PSCells by the T-SN.

In some embodiments, process 900 also includes MN 604, prior to receiving the cancellation indication, transmitting to the T-SN a request for a CPC configuration; and MN 604 receiving from the T-SN a response to the CPC preparation request, the response including a CPC configuration for the UE. In some embodiments, the CPC configuration for the UE is included in an RRCReconfiguration message.

In some embodiments, process 900 also includes MN 604 sending a message to a S-SN indicating that PSCells previously configured in a CPC configuration and belonging to the T-SN have been released from the CPC configuration; and MN 604 receiving a message from the S-SN informing that modified CPC configuration has been taken into account.

Figure 10:
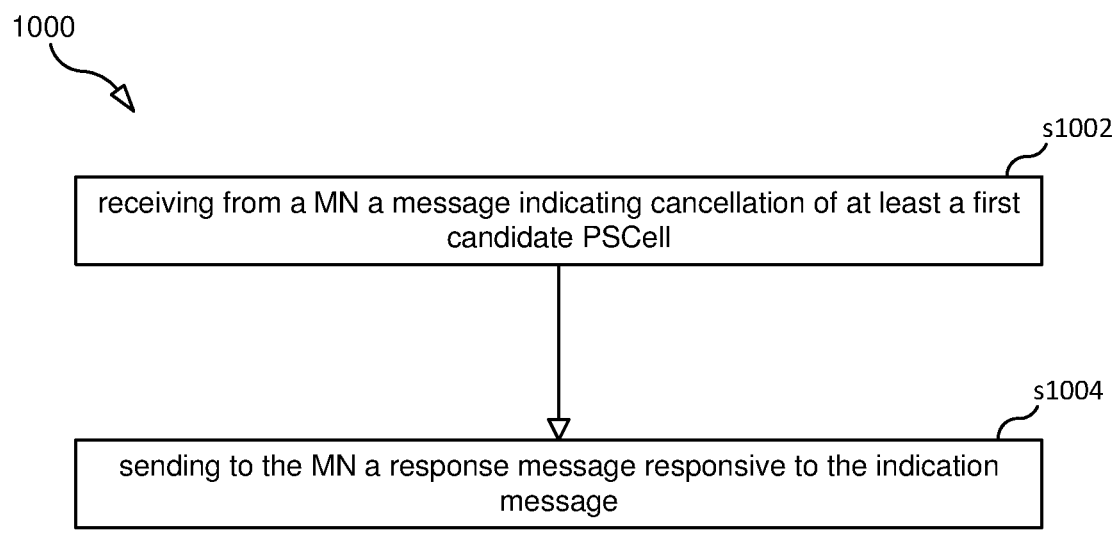
FIG. 10 is a flowchart illustrating a process according to an embodiment.

FIG. 10 is a flowchart illustrating a process 1000, according to an embodiment, that is performed by MN 604 for cancelling a CPC. Process 1000 may begin in step s1002. Step s1002 comprises S-SN 606 receiving from MN 604 a message indicating cancellation of at least a first candidate PSCell. Step s1004 comprises S-SN 606 sending to the MN a response message responsive to the indication message.

In some embodiments, the response message comprises a reconfiguration message for UE 602. In some embodiments, the reconfiguration message includes an indication for indicating to the UE that at least the first candidate PSCell is to be released.

In some embodiments, process 1000 also includes S-SN 606 receiving a confirmation transmitted by the MN, wherein the confirmation indicates that the UE has been successfully reconfigured.

In some embodiments, the reconfiguration message comprises a secondary cell group, SCG, RRCReconfiguration.

In some embodiments, the request message contains a list of cell identifiers, each cell identifier in the list identifying a candidate PSCell to be cancelled.

Figure 11:
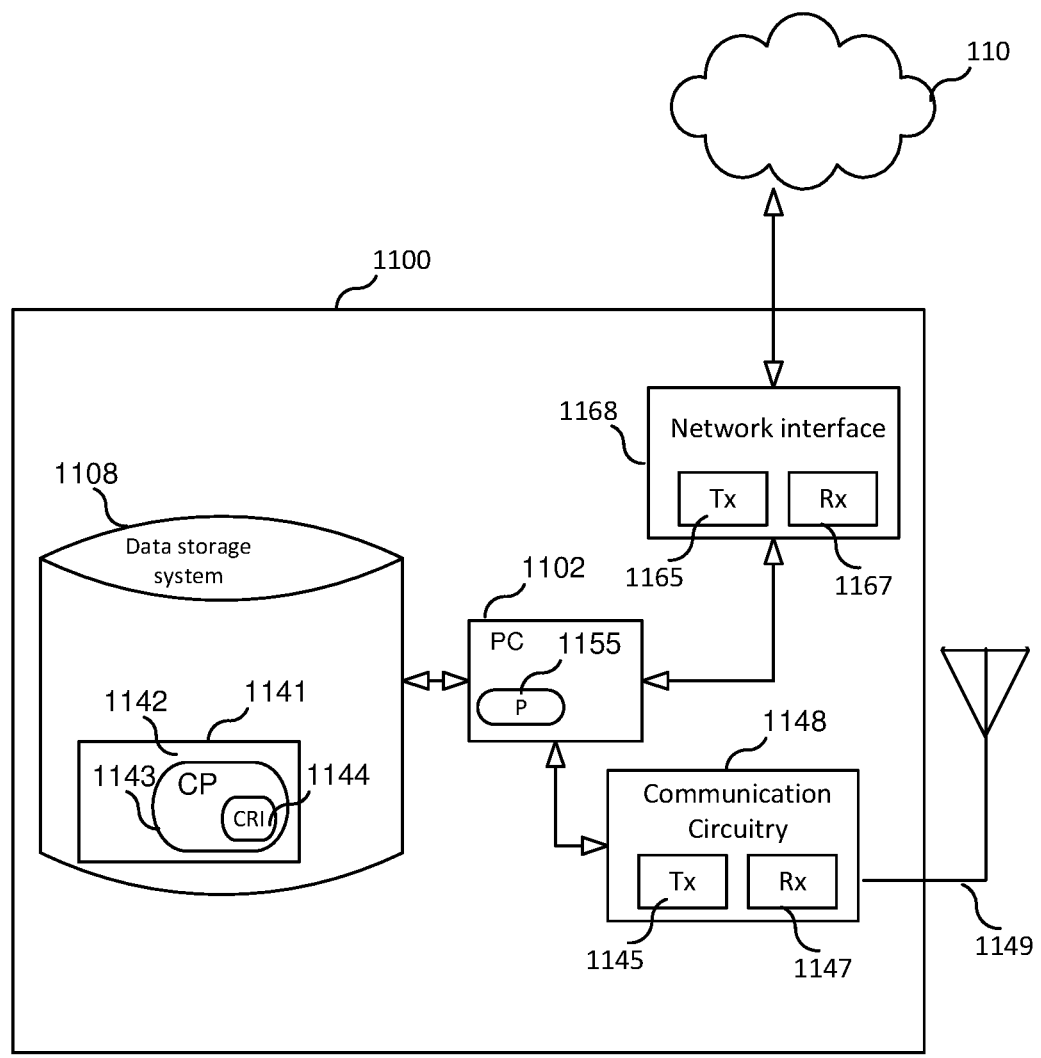
FIG. 11 is a block diagram of a network node according to an embodiment.

FIG. 11 is a block diagram of a network node 1100 (e.g., a base station or a component of a base station), according to some embodiments, for performing the methods disclosed herein. That is network node may implement MN 604, S-SN 606, or T-SN 608. As shown in FIG. 11, network node 1100 may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node may be a distributed computing apparatus); a network interface 1168 comprising a transmitter (Tx) 1165 and a receiver (Rx) 1167 for enabling network node 1100 to transmit data to and receive data from other nodes connected to a network 110 (e.g., an Internet Protocol (IP) network) to which network interface 1168 is connected; communication circuitry 1148 (e.g., radio transceiver circuitry comprising an Rx 1147 and a Tx 1145) coupled to an antenna system 1149 for wireless communication with UEs or other nodes); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes network node 1100 to perform steps described herein (e.g., steps described herein with reference to one or more flow charts). In other embodiments, network node 1100 may be configured to perform steps described herein without the need for code. That is, for example, PC 1102 may consist merely of one or more ASICs. Hence, the features of the embodiments described herein may be implemented in hardware and/or software.

Figure 12:
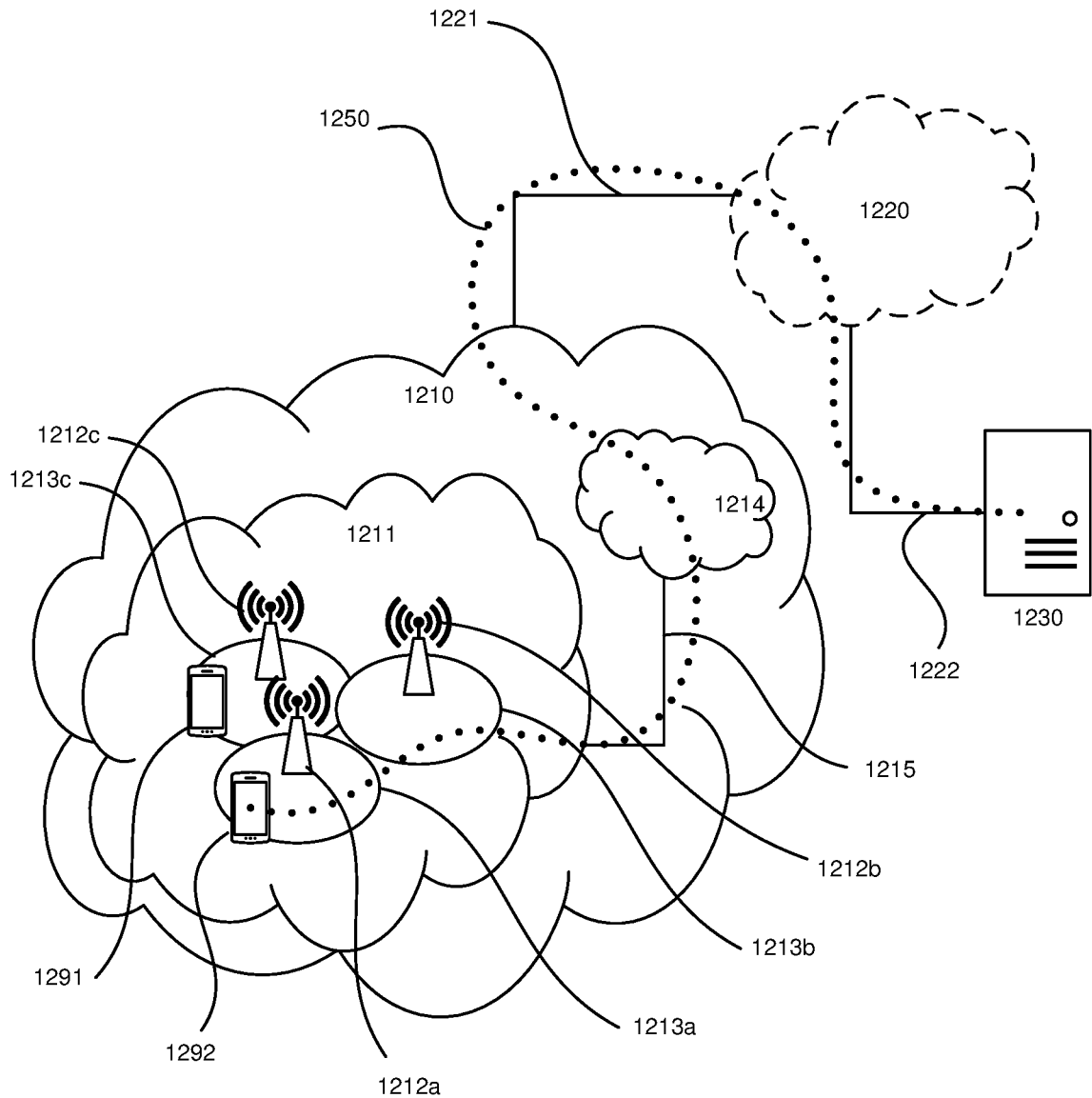
FIG. 12 illustrates a system according to an embodiment.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
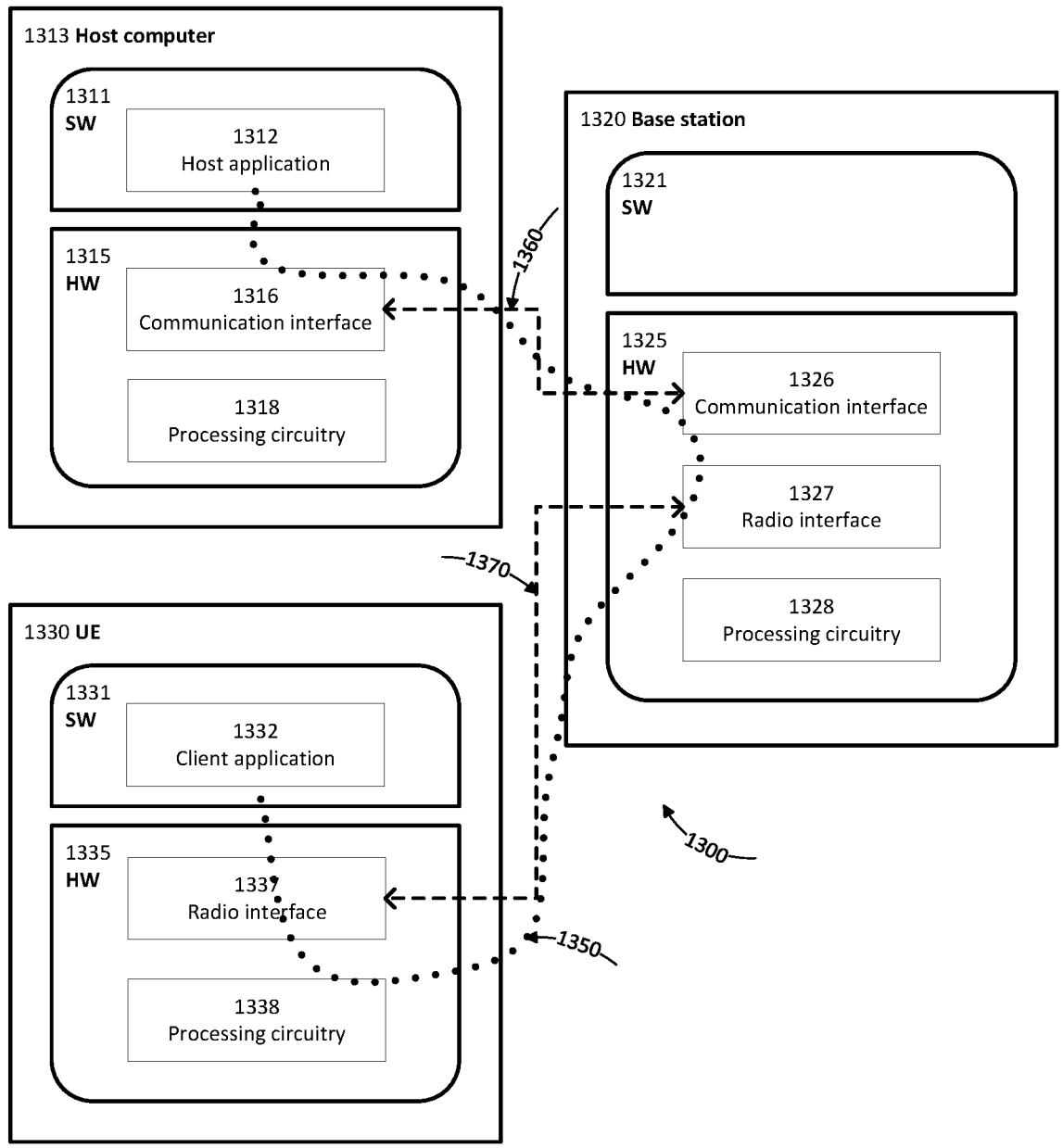
FIG. 13 illustrates a host computer communicating via a base station with a user equipment over a partially wireless connection in accordance with an embodiment.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve one or more of the date rate, latency, and power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figures 14, 15:
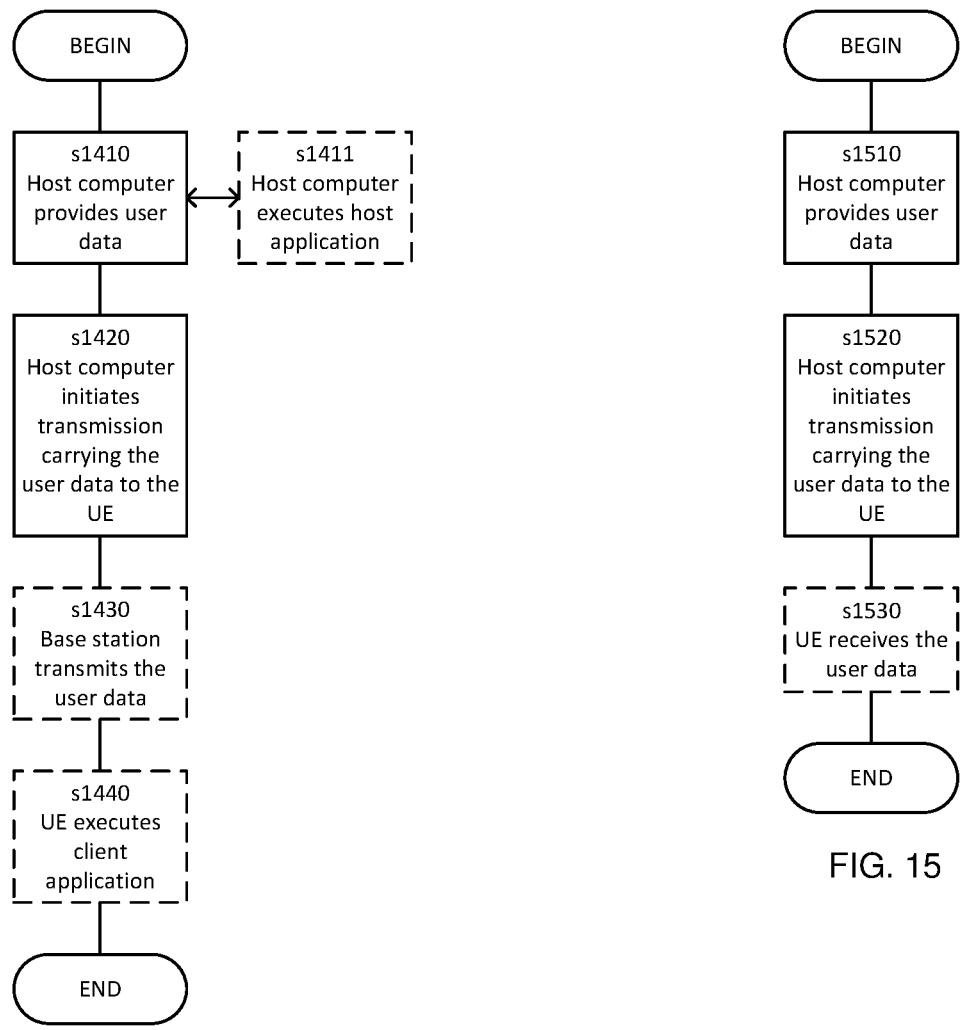
FIG. 14 is a flowchart illustrating a process according to an embodiment.
FIG. 15 is a flowchart illustrating a process according to an embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
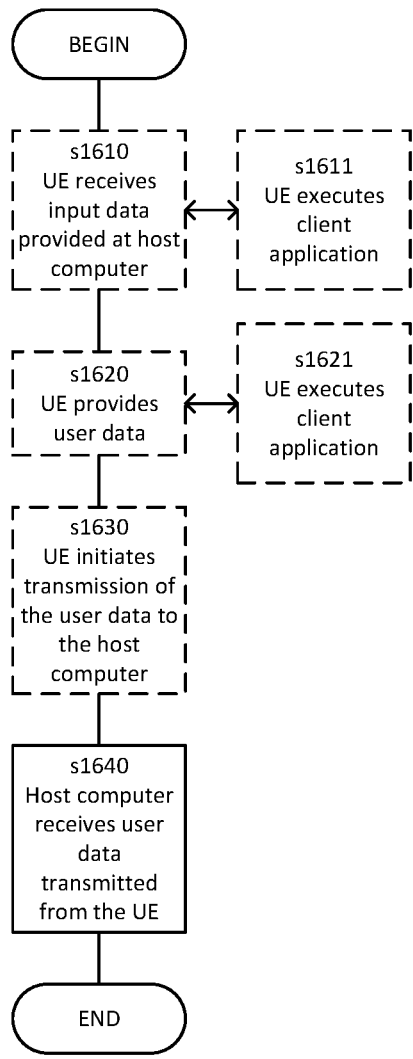
FIG. 16 is a flowchart illustrating a process according to an embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
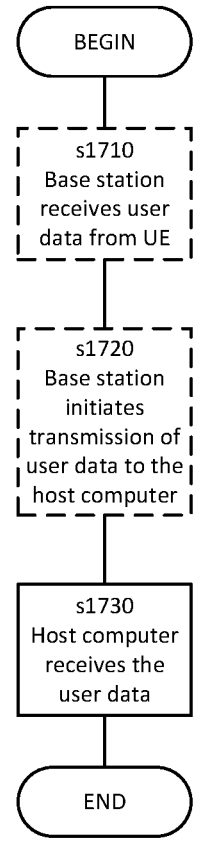
FIG. 17 is a flowchart illustrating a process according to an embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

SUMMARY OF ADDITIONAL EMBODIMENTS

1. A method performed by a base station operating as a candidate target secondary node (SN) for cancelling a conditional PSCell change (CPC), the method comprising: receiving a request from a master node (MN) to prepare a CPC-triggered conditional source node addition; transmitting to the MN a response to the request; and sending a cancelling indication to the MN indicating that a previously provided conditional SN addition configuration is not valid (i.e., is cancelled).
2. The method of embodiment 1, wherein receiving a request from a MN to prepare a CPC-triggered conditional SN addition comprises preparing the CPC for a UE connected to the MN and to the S-SN.
3. A method performed by a base station operating as a candidate target secondary node (SN) for cancelling a conditional PSCell change (CPC), the method comprising: receiving a request from a secondary node (SN) to prepare a CPC-triggered conditional source node addition; transmitting to the SN a response to the request; and sending a cancelling indication to the SN indicating that a previously provided conditional SN addition configuration is not valid.
4. The method of embodiment 1, wherein receiving a request from an SN to prepare a CPC-triggered conditional SN addition comprises preparing the CPC for a UE connected to the MN and to the S-SN.
5. The method of either of any of the above embodiments, and further comprising, upon sending the cancelling indication, performing at least one action, the at least one action being one or more of releasing of resources associated with the CPA that has been indicated to be cancelled and stopping supervision of a timer.
6. A method performed by a base station operating as a master node (MN) for cancelling a conditional PSCell change (CPC), the method comprising: receiving a cancelling indication from a target secondary node (SN) indicating that a previously provided conditional SN addition configuration is canceled; transmitting to the S-SN a request to modify a previously configured CPC; receiving the new SCG RRCReconfiguration from the S-SN; reconfiguring a UE to cancel or update a CPC associated with target secondary node; and sending a confirmation to the S-SN that the UE has been successfully reconfigured.
7. The method of claim 6, wherein transmitting to the S-SN a request to modify a previously configured CPC comprises taking into account cancelation of one or more candidate PSCells by the target.
8. The method of embodiment 5, wherein the new SCG RRCReconfiguration includes the removal of the target candidate cells in a remove list for which CPC is requested by the T-SN to be cancelled.
9. A method performed by a base station operating as a source node (SN) for cancelling a conditional PSCell change (CPC), the method comprising: receiving from a master node (MN) a request to modify a previously configured CPC; transmitting a new SCG RRCReconfiguration to the MN; removing the configuration for one or more conditional candidate PSCells; and receiving a confirmation from the MN that a UE has been successfully reconfigured.
10. The method of embodiment 9, wherein receiving from a master node (MN) a request to modify a previously configured CPC comprises taking into account the cancelation of one or multiple candidate PSCells by a T-SN.
11. A method performed by a base station operating as a target candidate secondary node (SN) for cancelling a conditional PSCell change (CPC), the method comprising: receiving a request from a master node (MN) to prepare a CPC-triggered conditional SN addition; transmitting to the MN a response to the conditional SN addition request; and sending a cancelling indication to the MN indicating that a previously provided conditional SN addition configuration is not valid.
12. The method of embodiment 11, wherein receiving a request from a MN to prepare a CPC-triggered conditional SN addition comprises preparing the CPC for a UE connected to the MN and to the S-SN.
13. A method performed by a base station operating as a target candidate secondary node (SN) for cancelling a conditional PSCell change (CPC), the method comprising: receiving a request from a secondary node (SN) to prepare a CPC-triggered conditional SN addition; transmitting to the SN a response to the conditional SN addition request; and sending a cancelling indication to the SN indicating that a previously provided conditional SN addition configuration is not valid.
14. The method of embodiment 13, wherein receiving a request from an SN to prepare a CPC-triggered conditional SN addition comprises preparing the CPC for a UE connected to the MN and to the S-SN.
15. The method of any of the above embodiments 12-15, and further comprising, upon sending the cancelling indication, performing at least one action, the at least one action being one or more of releasing of resources associated with the CPA that has been indicated to be cancelled and stopping supervision of a timer.
16. The method of any of the above embodiments 12-16, wherein the response comprises an RRCReconfiguration message and confirms that a UE may be accepted unless a canceling message is later received.

17. A method performed by a base station operating as a master mode for cancelling a conditional PSCell change (CPC), the method comprising: transmitting to a T-SN a request to prepare a conditional SN change; CPC); receiving from the T-SN a response to the CPC preparation request; receiving a cancelling indication from a T-SN indicating that a previously provided conditional SN addition configuration is not valid; reconfiguring a UE to remove candidate target cells for which CPC was cancelled; sending a message to the S-SN indicating that the PSCells previously configured in a CPC preparation phase and belonging to the T-SN have been removed from the UE CPC configuration; and receiving a message from the S-SN informing that new UE CPC configuration has been taken into account.

18. A method performed by a base station operating as a source secondary node (SN) for cancelling a conditional PSCell change (CPC), the method comprising: receiving from a master node (MN) a message indicating that one or more PSCells previously configured in a CPC Preparation phase and belonging to a T-SN are cancelled; and sending a message to the MN informing that new UE CPC configuration has been taken into account.

19. The method of any of the embodiments 1, 3, 11, 13, 16, or 17, or any embodiment depending therefrom, wherein the response comprises an RRCReconfiguration message and confirms that a UE may be accepted unless a canceling message is later received.

20. The method of any of the previous embodiments, further comprising: obtaining user data; and forwarding the user data to a host computer or a wireless device.

21. A base station for cancelling a conditional PSCell change (CPC), the base station comprising: processing circuitry configured to perform any of the steps of any one of embodiments 1-20; power supply circuitry configured to supply power to the base station.

22. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any one of embodiments 1-20.

23. The communication system of the previous embodiment further including the base station.

24. The communication system of the previous 2 embodiments, further including the UE, wherein the UE is configured to communicate with the base station.

25. The communication system of the previous 3 embodiments, wherein: the processing circuitry of the host computer is configured to execute a host application, thereby providing the user data; and the UE comprises processing circuitry configured to execute a client application associated with the host application.

26. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any one of embodiments 1-20.

27. The method of the previous embodiment, further comprising, at the base station, transmitting the user data.

28. The method of the previous 2 embodiments, wherein the user data is provided at the host computer by executing a host application, the method further comprising, at the UE, executing a client application associated with the host application.

29. A user equipment (UE) configured to communicate with a base station, the UE comprising a radio interface and processing circuitry configured to performs the of the previous 3 embodiments.

30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any one of embodiments 1-20.

31. The communication system of the previous embodiment further including the base station.

32. The communication system of the previous 2 embodiments, further including the UE, wherein the UE is configured to communicate with the base station.

33. The communication system of the previous 3 embodiments, wherein: the processing circuitry of the host computer is configured to execute a host application; the UE is configured to execute a client application associated with the host application, thereby providing the user data to be received by the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method performed by a target secondary node (T-SN) for cancelling a conditional primary secondary cell (PSCell) change, the method comprising:
receiving a request for a conditional PSCell change (CPC) configuration for a user equipment (UE), wherein the request was transmitted by a first network node (NN), and the UE is connected to the first NN and is also connected to a second NN;
transmitting to the first NN a response to the request, the response including the CPC configuration for the UE; and
after transmitting the response, transmitting to the first NN a cancellation indication indicating that the CPC configuration for the UE is cancelled.

2. The method of claim 1, further comprising, after receiving the request, allocating resources for the UE.

3. The method of claim 2, wherein the first NN is a master node (MN) and the second NN is a source secondary node (S-SN).

4. The method of claim 2, wherein the second NN is a master node (MN) and the first NN is a source secondary node (S-SN).

5. The method of claim 1, further comprising, after determining to send the cancelling indication, performing at least one of:
releasing resources that were allocated to the UE in response to receiving the request, or
stopping supervision of a timer.

6. The method of claim 1, wherein the CPC configuration comprises an RRCReconfiguration message.

7. The method of claim 6, wherein the RRCReconfiguration message is for a target candidate cell.

8. A method performed by a master node (MN) for cancelling a conditional primary secondary cell (PSCell) change, the method comprising:
receiving a cancellation indication transmitted by a target secondary node (T-SN) indicating that a conditional PSCell change (CPC) configuration previously provided to a user equipment (UE) is cancelled; and
after receiving the cancellation indication, reconfiguring the UE.

9. The method of claim 8, wherein reconfiguring the UE comprises causing the UE to release the CPC configuration.

10. The method of claim 8, wherein
the cancellation indication comprises information identifying one or more candidate PSCells served by the T-SN, and
reconfiguring the UE comprises causing the UE to release the identified candidate PSCells cells from the CPC configuration.

11. The method of claim 8, further comprising:
after reconfiguring the UE, sending a confirmation to a source secondary node, S-SN, that the UE has been successfully reconfigured.

12. The method of claim 8, further comprising:
after receiving the cancellation indication, transmitting to a source secondary node, S-SN, a message for indicating the cancellation.

13. The method of claim 12, wherein the message for indicating the cancellation includes a list of cells to be cancelled.

14. The method of claim 12, further comprising:
receiving a new Secondary Cell Group RRCReconfiguration transmitted by the S-SN.

15. The method of claim 14, wherein the new SCG RRCReconfiguration includes a list of candidate PSCells to be released from the CPC configuration.

16. The method of claim 12, further comprising taking into account cancelation of one or more candidate PSCells by the T-SN.

17. The method of claim 8, further comprising:
prior to receiving the cancellation indication, transmitting to the T-SN a request for a CPC configuration; and
receiving from the T-SN a response to the CPC preparation request, the response including a CPC configuration for the UE.

18. The method of claim 17, wherein the CPC configuration for the UE is included in an RRCReconfiguration message.

19. The method of claim 8, further comprising:
sending a message to a S-SN indicating that PSCells previously configured in a CPC configuration and belonging to the T-SN have been released from the CPC configuration; and
receiving a message from the S-SN informing that modified CPC configuration has been taken into account.

20. A network node-(1100), the network node being configured to perform a method comprising:
receiving a request for a conditional primary secondary cell (PSCell) change configuration for a user equipment (UE), wherein the request was transmitted by a first network node (NN), and the UE is connected to the first NN and is also connected to a second NN;
transmitting to the first NN a response to the request, the response including the conditional PSCell change (CPC) configuration for the UE; and
after transmitting the response, transmitting to the first NN a cancellation indication indicating that the CPC configuration for the UE is cancelled.

21. The network node of claim 20, wherein the method further comprises, after receiving the request, allocating resources for the UE.

22. A network node, the network node being configured to perform a method comprising:
receiving a cancellation indication transmitted by a target secondary node (T-SN) indicating that a conditional primary secondary cell (PSCell) change configuration previously provided to a user equipment (UE) is cancelled; and
after receiving the cancellation indication, reconfiguring the UE.

23. The network node of claim 22, wherein reconfiguring the UE comprises causing the UE to release the conditional PSCell change (CPC) configuration.

* * * * *